United States Patent [19]
Christian et al.

[11] Patent Number: 6,052,132
[45] Date of Patent: Apr. 18, 2000

[54] TECHNIQUE FOR PROVIDING A COMPUTER GENERATED FACE HAVING COORDINATED EYE AND HEAD MOVEMENT

[75] Inventors: Andrew Dean Christian, Lincoln; Brian Lyndall Avery, Lexington; Keith Waters, West Newton, all of Mass.

[73] Assignee: Digital Equipment Corporation, Maynard, Mass.

[21] Appl. No.: 09/020,036

[22] Filed: Feb. 6, 1998

[51] Int. Cl.[7] .................................................... G06F 15/00

[52] U.S. Cl. ........................................................ 345/474

[58] Field of Search .................................... 345/474, 475, 345/473, 427

[56] References Cited

U.S. PATENT DOCUMENTS

| | | | |
|---|---|---|---|
| 4,644,582 | 2/1987 | Morishita et al. | 382/6 |
| 4,821,029 | 4/1989 | Logan et al. | 340/712 |
| 4,851,616 | 7/1989 | Wales et al. | 178/18 |
| 5,048,103 | 9/1991 | Leclerc | 382/44 |
| 5,067,015 | 11/1991 | Combridge et al. | 358/133 |
| 5,105,186 | 4/1992 | May | 340/784 |
| 5,280,610 | 1/1994 | Travis, Jr. et al. | 395/600 |
| 5,376,947 | 12/1994 | Kurode | 345/173 |
| 5,440,744 | 8/1995 | Jacobson et al. | 395/650 |
| 5,504,921 | 4/1996 | Dev et al. | 395/800 |
| 5,519,866 | 5/1996 | Lawrence et al. | 395/700 |
| 5,551,027 | 8/1996 | Choy et al. | 395/600 |
| 5,581,758 | 12/1996 | Burnett et al. | 395/614 |
| 5,630,017 | 5/1997 | Gasper et al. | 395/2.85 |
| 5,640,558 | 6/1997 | Li | 395/612 |
| 5,652,880 | 7/1997 | Seagraves | 395/614 |
| 5,652,882 | 7/1997 | Doktor | 395/617 |
| 5,657,426 | 8/1997 | Waters et al. | 395/2.85 |

OTHER PUBLICATIONS

Describing Motion for Recognition, Little, et al., 1995 IEEE, pgs. 235–240.

Compact Representations of Videos Through Dominant and Multiple Motion Estimation, Sawhney, et al. IEEE 1996, pp. 814–830.

3D Human Body Model Acquisition from Multiple Views, Kakadiaris, et al., IEEE, 1995, pp. 618–623.

Analyzing Articulated Motion Using Expectation—Maximization, Rowley, et al. *Computer Vision and Pattern Recognition*, San Juan, PR, Jun. 1997, Total of 7 pages.

Mixture Modesl for Optical Flo9r Computation, Jepson, et al., University of toronto, Depart of Computer Science, Apr. 1993, pp. 1–16.

Analyzing and Recognizing Walking Figures in XYT, Niyogi, et al. IEEE 1994, pp. 469–474.

Nonparametric Recognition of Nonrigid Motion, Polana, et al, Department of Computer Science, 1994 pp. 1–29.

Model–Based Tracking of Self–Occluding Articulated Objects. Rehg. Et al., *5th Intl. Conf. on Computer Vision*, Cambridge, MA, Jun. 1995 total of 6 pages.

A Unified Mixture Framework for Motion Segmentation: Incorporating Spatial Coherence and Estimating The Number of Models, Weiss, et al., IEEE 1996, pp. 321–326.

Learning Visual Behaviour for Gesture Analysis, Wilson, et al. IEEE 1995, pp. 229–234.

(List continued on next page.)

*Primary Examiner*—Phu K. Nguyen
*Attorney, Agent, or Firm*—Jenkens & Gilchrist, P.C.

[57] ABSTRACT

A technique for providing a computer generated face having coordinated eye and head movement is realized by providing a computer generated movable head and at least one computer generated movable eye. The movement of the computer generated movable head and the movement of the at least one computer generated movable eye are coordinated such that the movement of the computer generated movable head follows the movement of the at least one computer generated movable eye.

33 Claims, 11 Drawing Sheets

OTHER PUBLICATIONS

Registration of Images with Geometric Distortions, Ardeshir Goshtasby, vol. 26, Jan. 1988, pp. 60–64.

The Integration of Optical Flow and Deformable Models with Applications to Human Face Shape and Motion Estimation, DeCarlo, et al IEEE 1996, pp. 231–238.

A Vision System for Observing and Extracting Facial Action Parameters, Essa, et al. IEEE 1994, pp. 76–83.

Realistic Modeling for Facial Animation, Lee, et al. *Computer Graphics Proceedings Annual Conference Series*, 1995 pp. 55–62.

Facial Feature Localization and Adaptation of a Generic Face Model for Model–Based Coding, Reinders, et al. Signal Processing: Image Communication vol. 7, pp. 57–74, 1995.

Real–time Recognition of Activity Using Temporatl Templates, Aaron F. Bobick, et al. *The Workshop on Applications of Computer Vision* Dec. 1996, pp. 1–5.

TECHNIQUE FOR PROVIDING A COMPUTER GENERATED FACE HAVING COORDINATED EYE AND HEAD MOVEMENT

FIELD OF THE INVENTION

The present invention relates generally to the field of computer generated modeling and, more particularly, to a technique for providing a computer generated face having coordinated eye and head movement.

BACKGROUND OF THE INVENTION

As is known in the art of computer animation and modeling, the DECface™ product developed by Digital Equipment Corporation provides a talking synthetic face. The DECface™ talking synthetic face is a visual complement to the DECtalk™ product, a speech synthesizer also developed by Digital Equipment Corporation. By combining the audio functionality of a speech synthesizer with the graphical functionality of a computer generated talking synthetic face, a variety of engaging user interfaces can be provided. Examples include internet-based agents capable of seeking and retrieving documents on the world-wide web, avatars for chat applications, and front-end interfaces for kiosks.

A technique for adaptively synchronizing an audio signal of a speech synthesizer with a facial image being displayed is described by Waters et al. in U.S. Pat. No. 5,657,426, entitled *Method and Apparatus for Producing Audio-Visual Synthetic Speech*, issued Aug. 12, 1997, assigned to the assignee of the present application, and hereby incorporated herein by reference. Waters et al. disclose a speech synthesizer that generates fundamental speech units called phonemes, which are converted into audio signals. The phonemes are also converted into visual facial configurations called visemes (i.e., distinct mouth postures). The visemes are grouped into sequences of mouth gestures approximating the gestures of speech. The sequence of mouth gestures are then synchronized to the corresponding audio signals.

While Waters et al. provide a technique for synchronizing audio speech with visual mouth gestures, other gestures, such as those associated with eye and head movement, are not addressed. That is, Waters et al. do not address providing other gestures which typically accompany mouth gestures during speech.

Also, Waters et al. do not address providing gestures which are not associated with speech. That is, Waters et al. do not address providing other gestures, such as those associated with eye and head movement, which by themselves are often a means of communication.

In view of the foregoing, it is apparent that previously proposed techniques for providing a computer generated synthetic face do not provide certain features which would make the computer generated synthetic face more realistic. Accordingly, it would be desirable to provide a technique for providing a more realistic computer generated synthetic face.

OBJECTS OF THE INVENTION

The primary object of the present invention is to provide a technique for providing a computer generated face having coordinated eye and head movement.

The above-stated primary object, as well as other objects, features, and advantages, of the present invention will become readily apparent from the following detailed description which is to be read in conjunction with the appended drawings.

SUMMARY OF THE INVENTION

According to the present invention, a technique for providing a computer generated face having coordinated eye and head movement is provided. The technique can be realized by having a processing device such as, for example, a digital computer, provide an image of a head on a display device such as, for example, a cathode ray tube (CRT) monitor. The processing device also provides an image of at least one eye on the display device. Each eye is typically associated with the head in a humanistic or other related manner. The processing device can control the movement of the head and the at least one movable eye on the display device.

If a single eye is provided, the processing device coordinates the movement of the eye and the movement of the head such that the movement of the head follows the movement of the eye. That is, the processing device first controls the movement of the eye to, for example, follow the movement of an object, and then controls the movement of the head to follow the movement of the object, thereby providing more realistic eye and head movement.

If more than one eye is provided, the processing device first controls the movement of all of the eyes so that, for instance, they will always be focused on a common target. The processing device then coordinates the movement of all the eyes and the movement of the head such that the movement of the head follows the movement of all the eyes. That is, the processing device controls the movement of all of the eyes to, for example, follow the movement of an object, and then controls the movement of the head to follow the movement of the object, thereby providing more realistic eye and head movement. Beneficially, the processing device controls the movement of the head and each eye such that the head and each eye are moved in a smooth and natural manner, thereby providing even more realistic head and eye movement.

Preferably, the processing device controls the movement of the head such that it can be rotated around any of three axes and translated along either of two axes. Similarly, the processing device preferably controls the movement of each eye such that it can be rotated around any of three axes and translated along either of two axes.

In accordance with other aspects of the invention, the processing device determines a target angle in relation to an associated direction of the head. The processing device then rotates the head an angle that is approximately ⅓ of the target angle, e.g. the angle at which an object is located, to compensate for an optical illusion associated with most display devices. Similarly, the processing device can determine a target angle in relation to an associated direction of each eye. The processing device can then rotate each eye an angle that is approximately ⅓ of the target angle to compensate for an optical illusion associated with most display devices.

In accordance with another aspect of the invention, the processing device provides a facial expression on the head while coordinating the movement of the head and the eye(s).

BRIEF DESCRIPTION OF THE DRAWINGS

In order to facilitate a fuller understanding of the present invention, reference is now made to the appended drawings.

These drawings should not be construed as limiting the present invention, but are intended to be exemplary only.

DETAILED DESCRIPTION OF THE INVENTION

Figure 1:
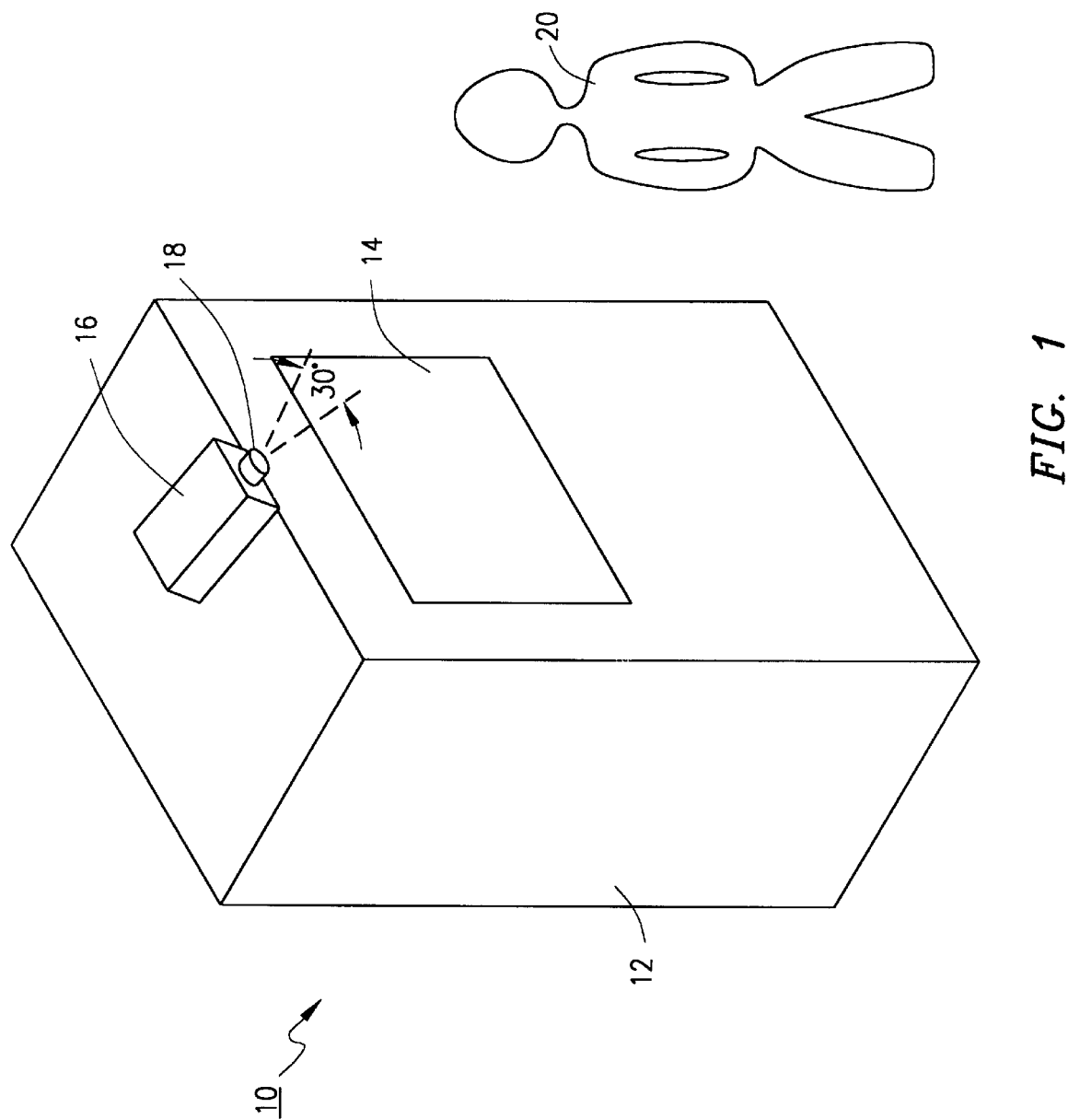
FIG. 1 shows a public kiosk having a video camera and a touchscreen monitor in accordance with the present invention.

Referring to FIG. 1, there is shown a public kiosk 10 comprising a cabinet 12 having a touchscreen monitor 14 mounted therein for providing an interactive display. A video camera 16, preferably having a wide angle lens 18, is mounted on top of the cabinet 12 such that it is aiming approximately 30 degrees downward from a horizontal plane. Thus, the video camera 16 is positioned such that the presence or absence of a human 20 or other object can be detected within the vicinity of the kiosk 10. It should be noted that the video camera 16 could alternatively be mounted within the cabinet 12, similar to the touchscreen monitor 14, as long as the field of vision of the video camera 16 is not hindered in any way.

The cabinet 12 houses a data processing device, such as a digital computer, that receives input data from the video camera 16 and the touchscreen monitor 14, and transmits output data to the touchscreen monitor 14 for controlling the interactive display. As described in more detail below, the cabinet 12 can also house other components, and the data processing device can also receive input data from and transmit output data to other components.

Figure 2:
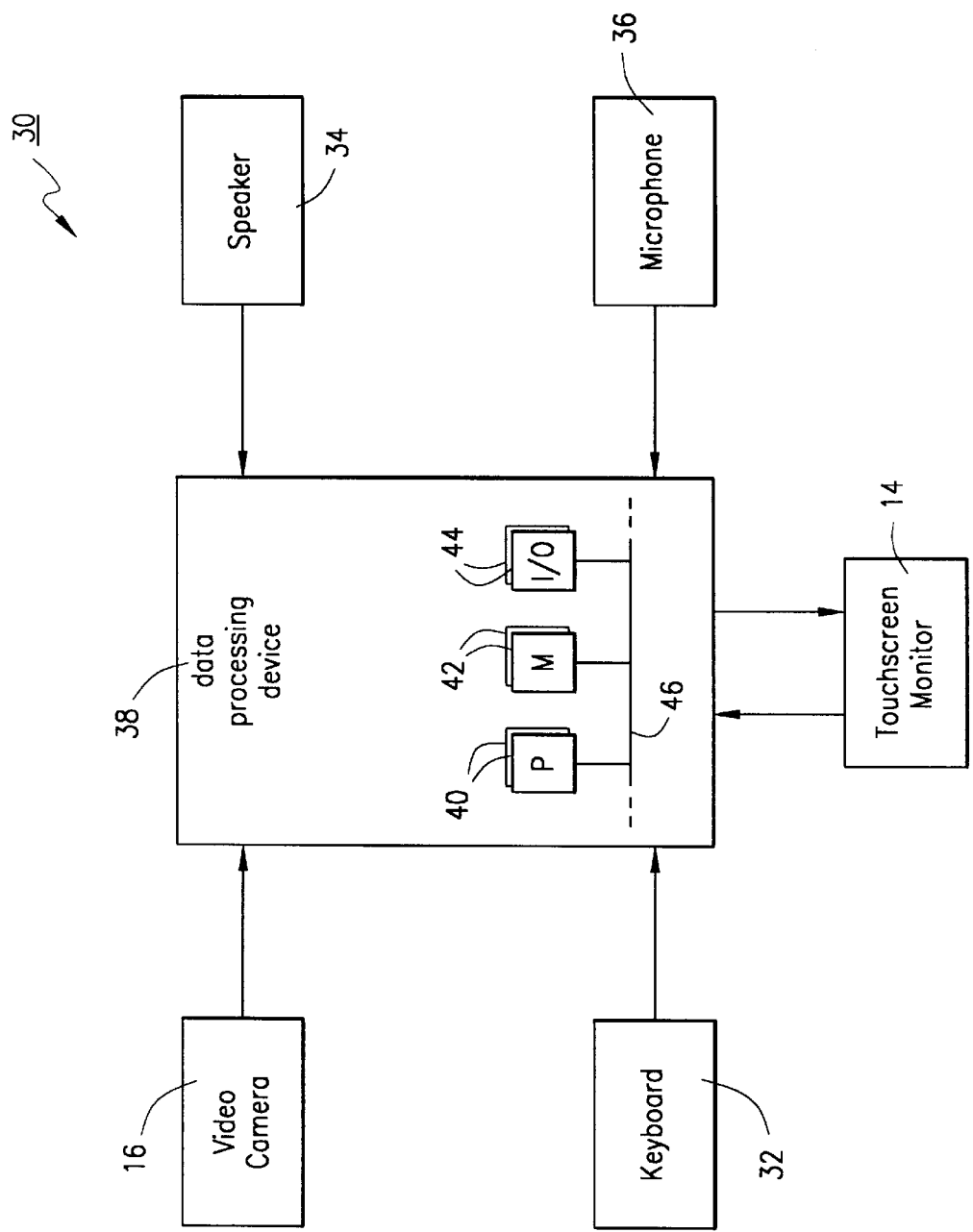
FIG. 2 is a schematic diagram of a data processing system in accordance with the present invention.

Referring to FIG. 2, there is shown a schematic diagram of a data processing system 30 comprising the touchscreen monitor 14 and the video camera 16. The data processing system 30 also comprises a keyboard 32, a speaker 34, a microphone 36, and a data processing device 38. As previously mentioned, the data processing device 38 receives input data from the video camera 16 and the touchscreen monitor 14, and transmits output data to the touchscreen monitor 14 for controlling the interactive display. The data processing device 38 can also receive input data from the keyboard 32 and the microphone 36, and transmit output data to the speaker 34 for controlling an audible signal. It should be noted that the data processing system 30 may comprise other components (e.g., a Doppler radar to detect objects), and the data processing device 38 may receive input data from and transmit output data to other components.

Preferably, the data processing device 38 is a digital computer that allows for multitasking. In an alternative embodiment, the data processing device 38 may be configured as several digital computers which communicate through one or more network connections.

The data processing device 38 processes input data that is received from the touchscreen monitor 14, the video camera 16, the keyboard 32, and the microphone 36, and generates output data that is transmitted to the touchscreen monitor 14 and the speaker 34. The processing of the input data and the generation of the output data are preferably implemented by software programs in the data processing device 38. Thus, the data processing device 38 preferably comprises at least one processor (P) 40, memory (M) 42, and input/output (I/O) interface 44, connected to each other by a bus 46, for implementing the processing of the input data and the generation of the output data.

The data processing device 38 receives input data from the touchscreen monitor 14, the video camera 16, the keyboard 32, and the microphone 36 via the I/O interface 44. The data processing device 38 transmits output data to the touchscreen monitor 14 and the speaker 34 via the I/O interface 44.

The data processing device 38 can process input data from the video camera 16 according to an image processing technique such as described in U.S. patent application Ser. No. 09/019,548, entitled *Technique for Processing Images,* in U.S. patent application Ser. No. 09/020,035, entitled *Technique for Differencing an Image,* in U.S. patent application Ser. No. 09/020,043, entitled *Technique for Locating Objects within an Image,* in U.S. patent application Ser. No. 09/020,203, entitled *Technique for Classifying Objects within an Image,* in U.S. patent application Ser. No. 09/045,877, entitled *Technique for Disambiguating Objects within an Image* in U.S. patent application Ser. No. 09/020,044, entitled *Technique for Tracking Objects Through a Series of Images,* and in U.S. patent application Ser. No. 09/019,549, entitled *Technique for Updating a Background Image,* all filed by Christian et al. on Feb. 26, 1998, and which are hereby incorporated herein by reference. The image processing technique disclosed therein allows an object to be located, classified, disambiguated, and tracked through a series of captured images. Such image processing techniques can be incorporated into the present invention to provide a realistic computer generated face having coordinated eye and head movement in accordance with the present invention.

It should be noted that input data from the other components in the data processing system 30, namely the touchscreen monitor 14, the keyboard 32, and the microphone 36, can also be processed by the data processing device 38 to provide a realistic computer generated face having coordinated eye and head movement in accordance with the present invention. The processing of the input data from these other components in the data processing system 30 will be described in detail below.

Figure 3:
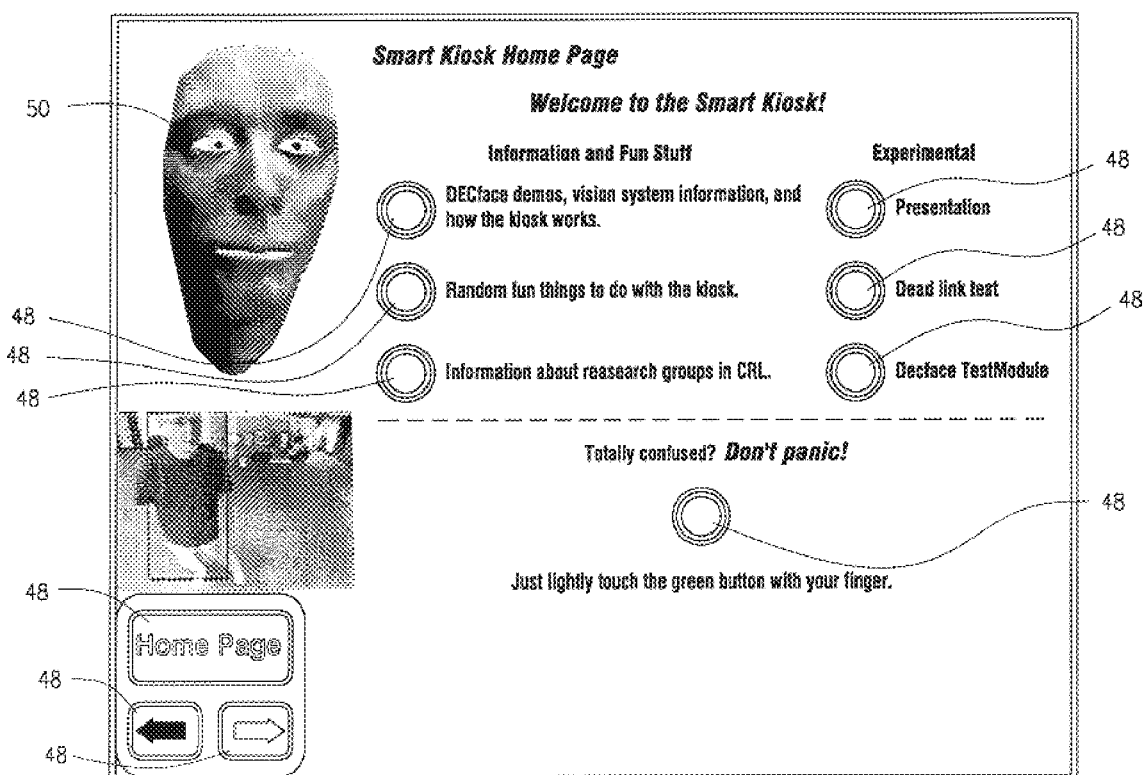
FIG. 3 shows an interactive display having a plurality of touchscreen buttons and a computer generated synthetic face in accordance with the present invention.

As previously mentioned, the output data to the touchscreen monitor 14 controls the interactive display. The interactive display can take many forms, one of which having a plurality of touchscreen buttons 48 and a computer generated synthetic face 50 as shown in FIG. 3. As shown, the computer generated synthetic face 50 may comprise all of the features of a human face such as, for example, a forehead, cheeks, mouth, nose, etc. For such a computer generated synthetic face 50 to be realistic, it must react and communicate in a humanistic manner. This generally means that the computer generated synthetic face 50 must exhibit coordinated eye and head movement.

Figure 4:
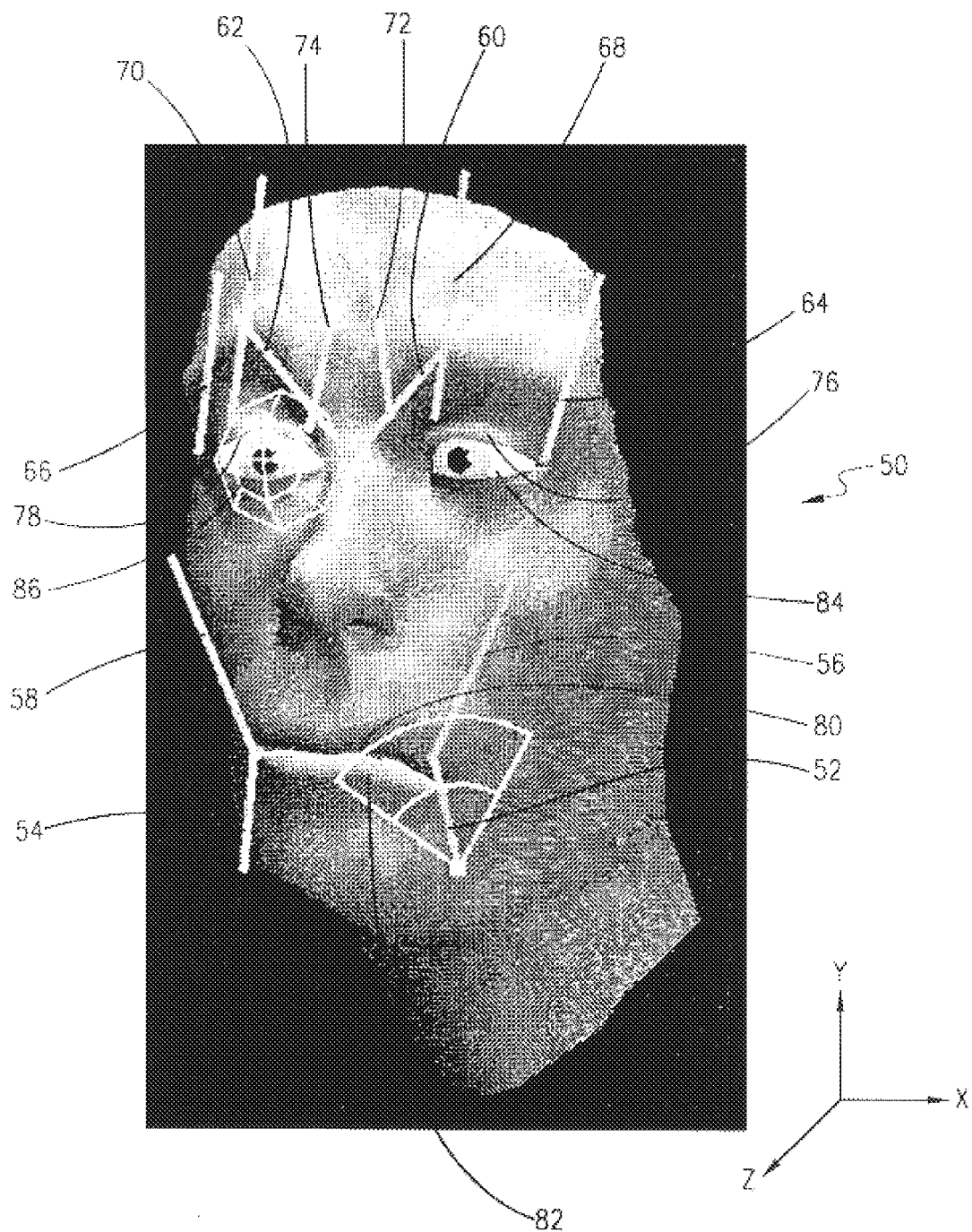
FIG. 4 shows a detailed representation of a computer generated synthetic face in accordance with the present invention.

Referring to FIG. 4, there is shown a detailed representation of the computer generated synthetic face 50. The computer generated synthetic face 50 has superimposed thereon a lower right cheek muscle indication line 52, a lower left cheek muscle indication line 54, an upper right cheek muscle indication line 56, an upper left cheek muscle indication line 58, an upper right nose muscle indication line 60, an upper left nose muscle indication line 62, an outer right eyebrow muscle indication line 64, an outer left eyebrow muscle indication line 66, an inner right eyebrow muscle indication line 68, an inner left eyebrow muscle indication line 70, a right forehead muscle indication line 72, and a left forehead muscle indication line 74. All of the above-identified indication lines indicate muscles of the computer generated synthetic face 50 that are controllable by the data processing device 38. That is, each of the above-identified facial muscles of the computer generated synthetic face 50 are individually controllable by the data processing device 38, as will be described in more detail below.

The data processing device 38 can also individually control a right eyelid 76 and a left eyelid 78 of the computer generated synthetic face 50. That is, the data processing device 38 can control the opening and closing of the right eyelid 76 and the left eyelid 78 of the computer generated synthetic face 50, as will be described in more detail below.

Figure 5:
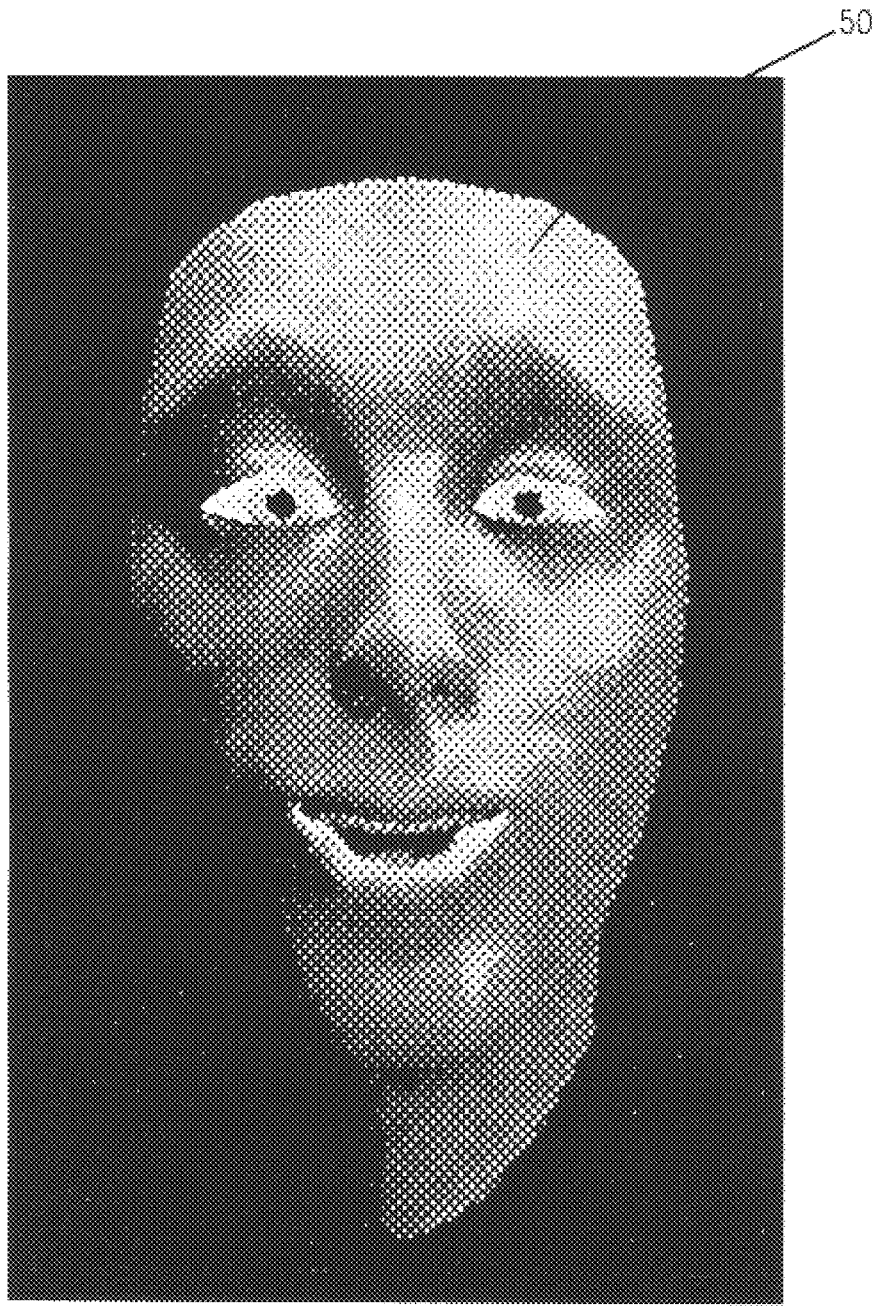
FIG. 5 shows a computer generated synthetic face with an expression of "surprise" in accordance with the present invention.

It should be noted that an upper lip 80 and a lower lip 82 of the computer generated synthetic face 50, as well as the teeth (see FIG. 5) of the computer generated synthetic face 50, can be controlled in accordance with the distinct mouth postures, or visemes, that are described in U.S. Pat. No. 5,657,426, which was previously incorporated herein by reference.

The data processing device 38 can further individually control a right eye 84 and a left eye 86 of the computer generated synthetic face 50. That is, the data processing device 38 can control the rotation of the right eye 84 and the left eye 86 of the computer generated synthetic face 50 around corresponding X, Y, and Z axes (i.e., each eye having three degrees of freedom), the translation of the right eye 84 and the left eye 86 of the computer generated synthetic face 50 along corresponding X and Y axes (i.e., each eye having two degrees of freedom), and the overall scale of the right eye 84 and the left eye 86 of the entire computer generated synthetic face 50 in the interactive display, as will be described in more detail below.

It should be noted that by individually controlling the movement of the right eye 84 and the left eye 86 of the computer generated synthetic face 50, the processing device can control the convergence of the right eye 84 and the left eye 86 of the computer generated synthetic face 50 (i.e., the point at which both the right eye 84 and the left eye 86 are directed).

The data processing device 38 can further individually control the entire computer generated synthetic face 50. That is, the data processing device 38 can control the rotation of the entire computer generated synthetic face 50 around corresponding X, Y, and Z axes (i.e., three degrees of freedom), the translation of the entire computer generated synthetic face 50 along corresponding X and Y axes (i.e., two degrees of freedom), and the overall scale of the entire computer generated synthetic face 50 in the interactive display, as will be described in more detail below.

At this point it should be noted that the data processing device 38 controls all of the above-identified facial components such that all of the above-identified facial components are moved in a gradual, non-instantaneous, manner, similar to the natural movement of a human or other type face, so that the computer generated synthetic face 50 appears more realistic.

The data processing device 38 controls all of the above-identified facial components by providing output data to the touchscreen monitor 14 to control the interactive display. The output data is typically display data that the touchscreen monitor 14 merely presents as the interactive display. For example, referring to FIG. 5, the data processing device 38 can individually control the above-identified facial components to provide the computer generated synthetic face 50 with an expression of "surprise". More specifically, the data processing device 38 controls the upper right cheek muscle 56 to contract, the upper left cheek muscle 58 to contract, the inner right eyebrow muscle 68 to contract, and the inner left eyebrow muscle 70 to contract. The facial components that were not specifically mentioned above as being controlled by the data processing device 38 may remain in a nominal position.

Figure 6:
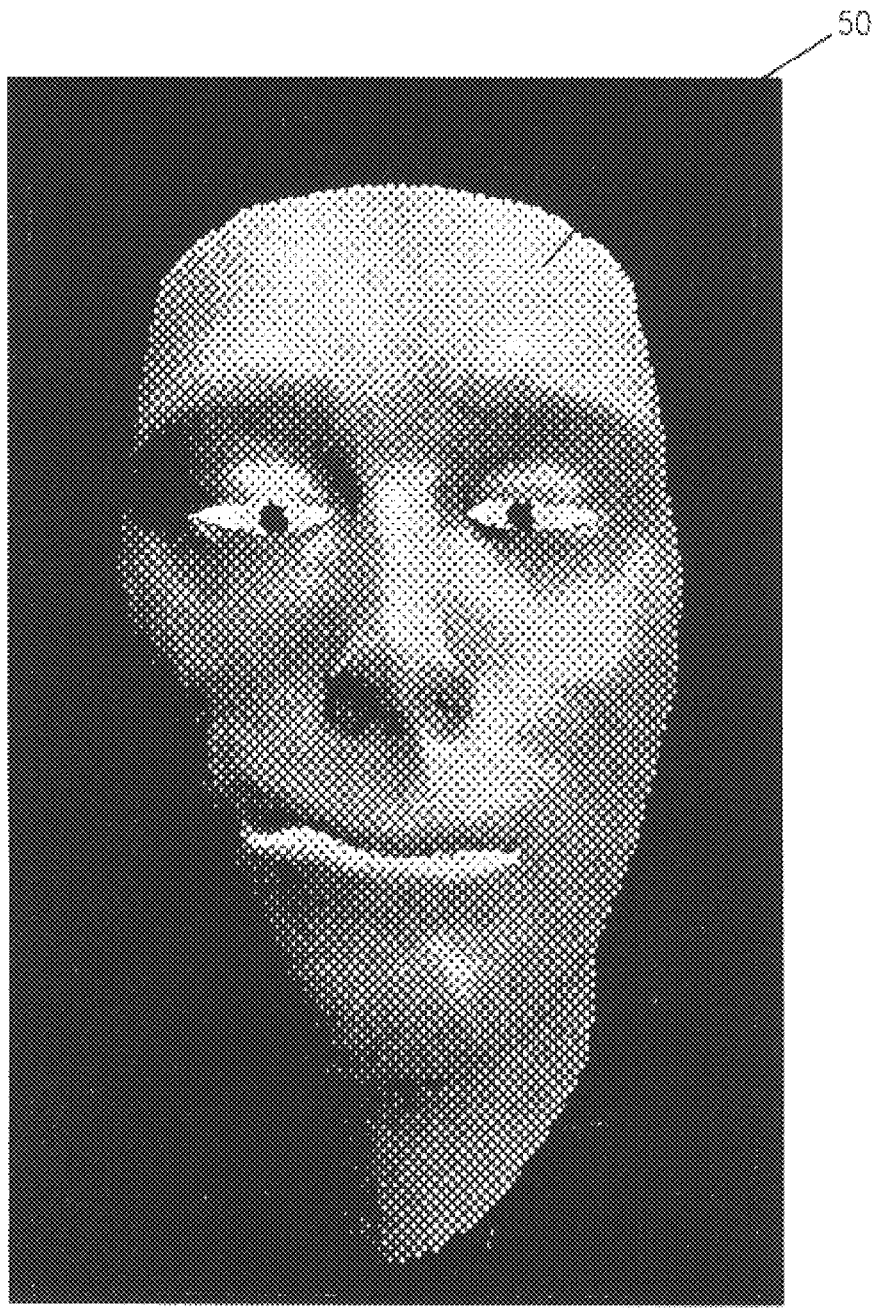
FIG. 6 shows a computer generated synthetic face with an expression of "disgust" in accordance with the present invention.

Referring to FIG. 6, the data processing device 38 can also individually control the above-identified facial components to provide the computer generated synthetic face 50 with an expression of "disgust". More specifically, the data processing device 38 controls the lower left cheek muscle 54 to contract, the upper left cheek muscle 58 to contract, the lower right cheek muscle 52 to contract slightly, the upper right cheek muscle 56 to contract slightly, the right eyelid 76 to lower slightly, the left eyelid 78 to lower slightly, the left eye 86 to rotate downwards slightly, and the right eye 84 to rotate downwards slightly. Again, the facial components that were not specifically mentioned above as being controlled by the data processing device 38 may remain in a nominal position.

As evidenced by the slight closing of the right eyelid 76 and the left eyelid 78 in FIG. 6, the data processing device 38 can control the above-identified facial components to a matter of degree.

The data processing device 38 can control all of the above-identified facial components so that the computer generated synthetic face 50 appears more realistic by processing the input data received from the touchscreen monitor 14, the video camera 16, the keyboard 32, and the microphone 36. This input data can provide useful information to the data processing device 38. For example, input data from the touchscreen monitor 14 can indicate the presence of a person at the public kiosk 10 to the data processing device 38, input data from the keyboard 32 can be a programmed command to the data processing device 38 from an operator, and input data from the microphone 36 can indicate the occurrence of an external event to the data processing device 38. Input data from the video camera 16 provides probably the most useful information to the data processing device 38 because, as mentioned above, this input data can be processed by an image processing technique such as the one referred to above, which allows an object to be located, classified, disambiguated, and tracked through a series of captured images. Thus, the data processing device 38 can process input data received from the video camera 16 and thereby direct and conform the computer generated synthetic face 50 accordingly.

Since the previously disclosed image processing technique allows an object to be located, classified, disambiguated, and tracked through a series of captured images, the data processing device 38 can control the computer generated synthetic face 50 to be directed at the object, whether the object is at rest or moving. For example, if the object is a human that is moving past the kiosk 10, the data processing device 38 can control the computer generated synthetic face 50 to follow the human as it moves past the kiosk 10. The data processing device 38 can control the eyes 84 and 86 of the computer generated synthetic face 50 to be directed at and focused on the moving human, as well as the entire computer generated synthetic face 50. That is, the data processing device 38 can control the rotation of the right eye 84 and the left eye 86 of the computer generated synthetic face 50 around corresponding X, Y, and Z axes, the translation of the right eye 84 and the left eye 86 of the computer generated synthetic face 50 along corresponding X and Y axes, and thereby the convergence of the right eye 84 and the left eye 86 of the computer generated synthetic face 50 such that the eyes 84 and 86 of the computer generated synthetic face 50 appear to be following the movement of the moving human. Also, the data processing device 38 can control the rotation of the entire computer generated synthetic face 50 around corresponding X, Y, and Z axes, and the translation of the entire computer generated synthetic face 50 along corresponding X and Y axes such that the entire computer generated synthetic face 50 appears to be following the movement of the moving human.

Figure 7:
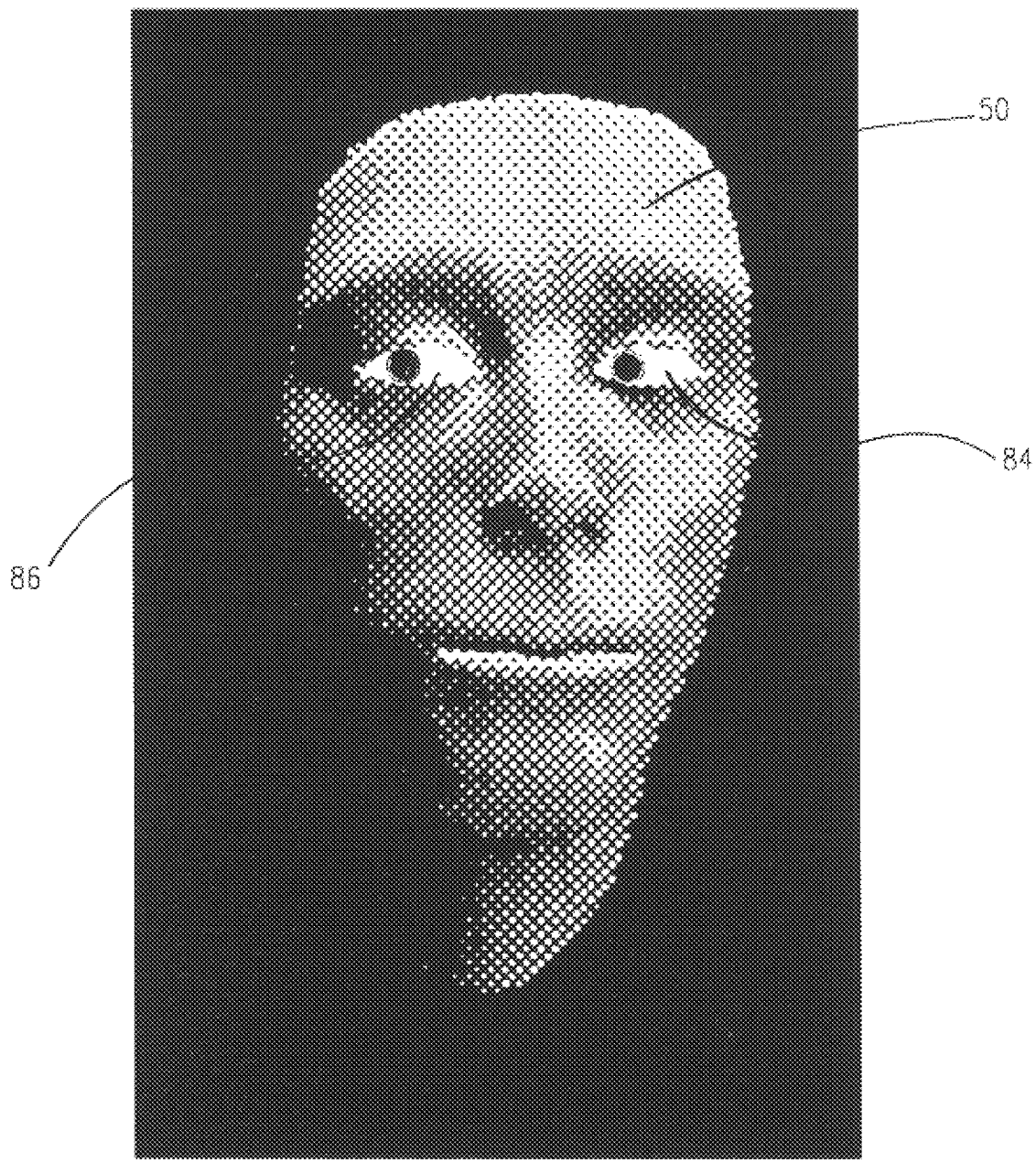
FIG. 7 shows an entire computer generated synthetic face being directed in one direction, while the eyes of the computer generated synthetic face are directed in another direction, in accordance with the present invention.

As previously indicated, the data processing device 38 can control the eyes 84 and 86 of the computer generated synthetic face 50 and the entire computer generated synthetic face 50 independently of each other. That is, the data processing device 38 can control the eyes 84 and 86 of the computer generated synthetic face 50 to follow the movement of the moving human, but not the entire computer generated synthetic face 50, or vice versa. For example, referring to FIG. 7, the entire computer generated synthetic face 50 is shown directed in one direction, while the eyes 84 and 86 of the computer generated synthetic face 50 are shown directed in another direction.

Alternatively, the data processing device 38 can first control the eyes 84 and 86 of the computer generated synthetic face 50 to follow the movement of the moving human, and then control the entire computer generated synthetic face 50 to follow the movement of the moving human, or vice versa. Such coordinated eye and face movements provide human characteristics to the computer generated synthetic face 50, thereby making the computer generated synthetic face 50 more realistic.

Since the previously disclosed image processing technique specifically allows a plurality of objects to be located, classified, disambiguated, and tracked through a series of captured images, the data processing device 38 can control the computer generated synthetic face 50 to "acknowledge" each of the plurality of objects. For example, if the plurality of objects are a crowd of humans, the data processing device 38 can control the computer generated synthetic face 50 to "acknowledge" the entire crowd of humans by having the computer generated synthetic face 50 "scan" the entire crowd of humans. The data processing device 38 can control the eyes 84 and 86 of the computer generated synthetic face 50 to "scan" the entire crowd of humans, as well as the entire computer generated synthetic face 50. That is, the data processing device 38 can control the rotation of the right eye 84 and the left eye 86 of the computer generated synthetic face 50 around corresponding X, Y, and Z axes, the translation of the right eye 84 and the left eye 86 of the computer generated synthetic face 50 along corresponding X and Y axes, and thereby the convergence of the right eye 84 and the left eye 86 of the computer generated synthetic face 50 such that the eyes 84 and 86 of the computer generated synthetic face 50 appear to be directed at and focused on each of the individual humans in the crowd of humans for at least a brief period of time. Also, the data processing device 38 can control the rotation of the entire computer generated synthetic face 50 around corresponding X, Y, and Z axes, and the translation of the entire computer generated synthetic face 50 along corresponding X and Y axes such that the entire computer generated synthetic face 50 appears to be directed at each of the individual humans in the crowd of humans for corresponding periods of time.

As described above, the data processing device 38 can control the eyes 84 and 86 of the computer generated synthetic face 50 and the entire computer generated synthetic face 50 independently of each other. That is, the data processing device 38 can control the eyes 84 and 86 of the computer generated synthetic face 50 to be directed at and focused on each of the individual humans in the crowd of humans for at least a brief period of time, but not the entire computer generated synthetic face 50, or vice versa. Alternatively, the data processing device 38 can first control the eyes 84 and 86 of the computer generated synthetic face 50 to be directed at and focused on each of the individual humans in the crowd of humans for at least a brief period of time, and then control the entire computer generated synthetic face 50 to be directed at each of the individual humans in the crowd of humans for at least a brief period of time, or vice versa. Such coordinated eye and face movements provide human characteristics to the computer generated synthetic face 50, thereby making the computer generated synthetic face 50 more realistic.

Since the previously disclosed image processing technique specifically allows a particular object within a plurality of other objects to be located, classified, disambiguated, and tracked through a series of captured images, the data processing device 38 can control the computer generated synthetic face 50 to be directed at the particular object within the plurality of other objects, whether the particular object is at rest or moving. For example, if the particular object is a particular human within a crowd of other humans that are moving past the kiosk 10, the data processing device 38 can control the computer generated synthetic face 50 to follow the particular human within the crowd of other humans as the particular human moves past the kiosk 10. The data processing device 38 can control the eyes 84 and 86 of the computer generated synthetic face 50 to be directed at and focused on the particular moving human, as well as the entire computer generated synthetic face 50. That is, the data processing device 38 can control the rotation of the right eye 84 and the left eye 86 of the computer generated synthetic face 50 around corresponding X, Y, and Z axes, the translation of the right eye 84 and the left eye 86 of the computer generated synthetic face 50 along corresponding X and Y axes, and thereby the convergence of the right eye 84 and the left eye 86 of the computer generated synthetic face 50 such that the eyes 84 and 86 of the computer generated synthetic face 50 appear to be following the movement of the particular moving human. Also, the data processing device 38 can control the rotation of the entire computer generated synthetic face 50 around corresponding X, Y, and Z axes, and the translation of the entire computer generated synthetic face 50 along corresponding X and Y axes such that the entire computer generated synthetic face 50 appears to be following the movement of the particular moving human.

As described above, the data processing device 38 can control the eyes 84 and 86 of the computer generated synthetic face 50 and the entire computer generated synthetic face 50 independently of each other. That is, the data processing device 38 can control the eyes 84 and 86 of the computer generated synthetic face 50 to follow the movement of the particular moving human, but not the entire computer generated synthetic face 50, or vice versa. Alternatively, the data processing device 38 can first control the eyes 84 and 86 of the computer generated synthetic face 50 to follow the movement of the particular moving human, and then control the entire computer generated synthetic face 50 to follow the movement of the particular moving human, or vice versa. Such coordinated eye and face movements provide human characteristics to the computer generated synthetic face 50, thereby making the computer generated synthetic face 50 more realistic.

The data processing device 38 can also control the individual facial muscles of the computer generated synthetic face 50 in response to input data from the video camera 16. For example, the data processing device 38 can process input data received from the video camera 16 according to the previously described image processing technique, and thereby conform the computer generated synthetic face 50 accordingly. An appropriate circumstance for such action could be when a human approaching the public kiosk 10 is detected. The data processing device 38 could then control the facial muscles of the computer generated synthetic face 50 to display a smile as a greeting to the human.

Similarly, the data processing device 38 can process input data received from the touchscreen monitor 14, the keyboard 32, and the microphone 36, and then conform the computer generated synthetic face 50 accordingly. For instance, the microphone 36 could detect a voice, and the data processing device 38 could process the voice via a voice recognition algorithm. The data processing device 38 could then control the facial muscles of the computer generated synthetic face 50 in response to any number of predefined recognized words or phrases. For example, the data processing device 38 can control the facial muscles of the computer generated synthetic face 50 to display a frown every time the word "NO" is recognized.

Also, the touchscreen monitor 14 could detect a selection that is made by touching a touchscreen button 48 on the touchscreen monitor 14, and the data processing device 38 could process the selection via a selection algorithm. The data processing device 38 could then control the facial muscles of the computer generated synthetic face 50 in response to the particular selection that is made. For example, the data processing device 38 can control the facial muscles of the computer generated synthetic face 50 to display a look of excitement every time a particular selection is made.

Further, a command could be entered by an operator on the keyboard 32, and the data processing device 38 could process the command via a programmed command algorithm. The data processing device 38 could then control the facial muscles of the computer generated synthetic face 50 in response to the particular command that is entered. For example, the data processing device 38 can control the facial muscles of the computer generated synthetic face 50 to display an inquisitive look every time a particular command is entered.

All of the above-described facial expressions can be displayed, for example, while the eyes 84 and 86 of the computer generated synthetic face 50 are being directed toward and focused on the person approaching the kiosk 10 or making the selection on the touchscreen monitor 14. Likewise, the above-described facial gestures can be displayed, for example, while the entire computer generated synthetic face 50 is being directed at the person approaching the kiosk 10 or making the selection on the touchscreen monitor 14. Furthermore, as previously described, the above-described facial gestures can be displayed while the data processing device 38 controls the movement of the eyes 84 and 86 of the computer generated synthetic face 50 and the movement of entire computer generated synthetic face 50 in a coordinated fashion. Thus, a realistic computer generated synthetic face 50 exhibiting coordinated eye and head movement is provided.

It should be noted that the control of the facial muscles, as well as the control of the eyes 84 and 86 of the computer generated synthetic face 50 and the entire computer generated synthetic face 50, is additive. That is, the movement of more than one facial muscle can be controlled while the processing device 38 is also controlling the movement of the eyes 84 and 86 of the computer generated synthetic face 50 and the entire computer generated synthetic face 50. For example, the processing device 38 can control the facial muscles to display a smile on the computer generated synthetic face 50 while controlling the winking of one of the eyes 84 and 86 of the computer generated synthetic face 50, all while controlling the rotating of the entire computer generated synthetic face 50.

It should also be noted that, the processing device 38 controls the movement of the facial muscles, as well as the eyes 84 and 86 of the computer generated synthetic face 50 and the entire computer generated synthetic face 50, in a dynamic manner. That is, the processing device 38 controls the movement of the facial muscles, the eyes 84 and 86 of the computer generated synthetic face 50, and the entire computer generated synthetic face 50 such that the movement is performed over a certain period of time. For example, the processing device 38 controls the facial muscles to display a smile by gradually raising the upper right cheek muscle 56 and the upper left cheek muscle 58 over a period of time until a full smile is displayed. Thus, the facial muscles, as well as the eyes 84 and 86 of the computer generated synthetic face 50 and the entire computer generated synthetic face 50, are controlled to move in a natural and smooth manner.

Figure 8:
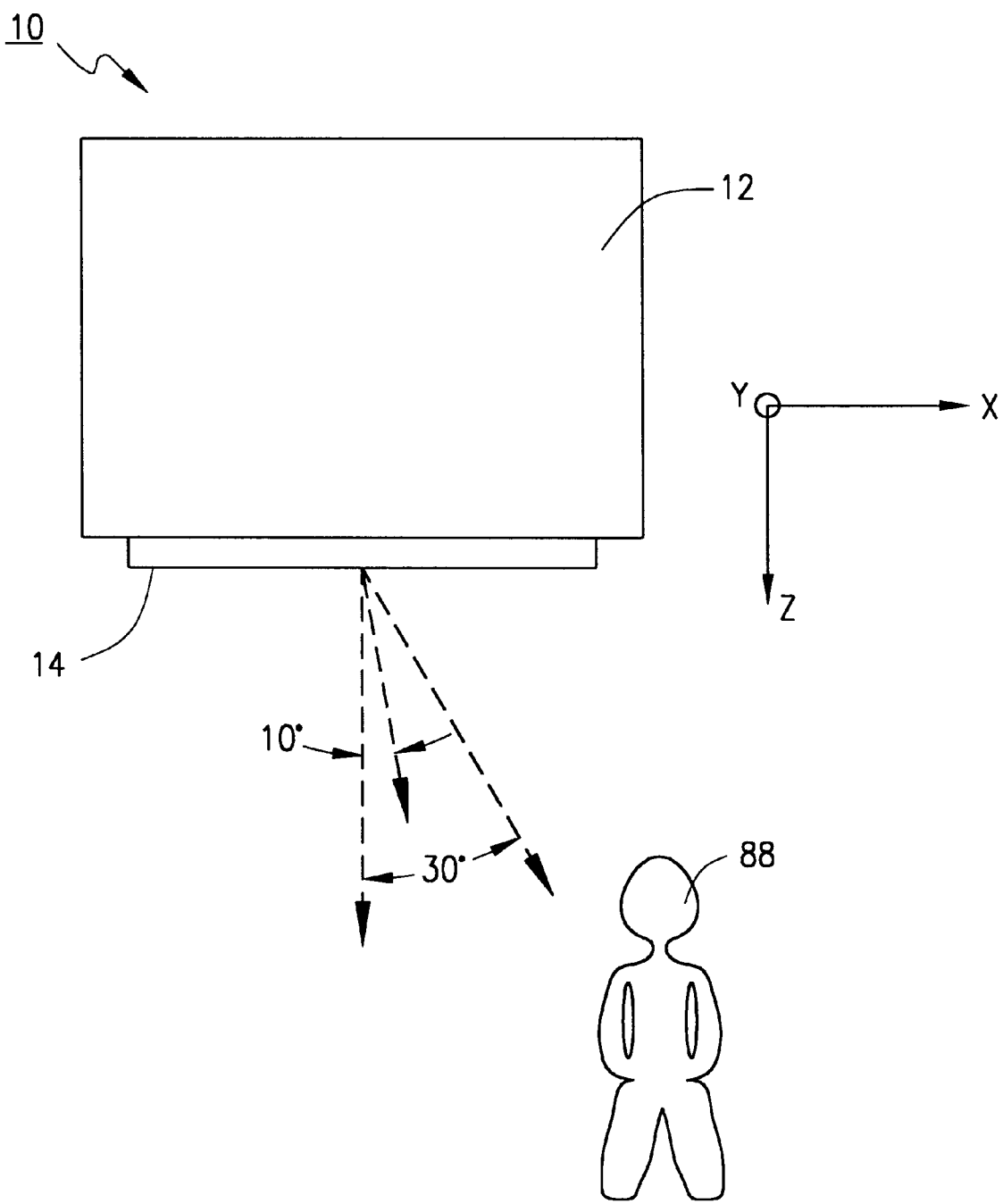
FIG. 8 is a top view of the public kiosk shown in FIG. 1 for illustrating an optical illusion compensation technique in accordance with the present invention.
Figure 9:
FIG. 9 shows a computer generated woman face in accordance with the present invention.
Figure 10:
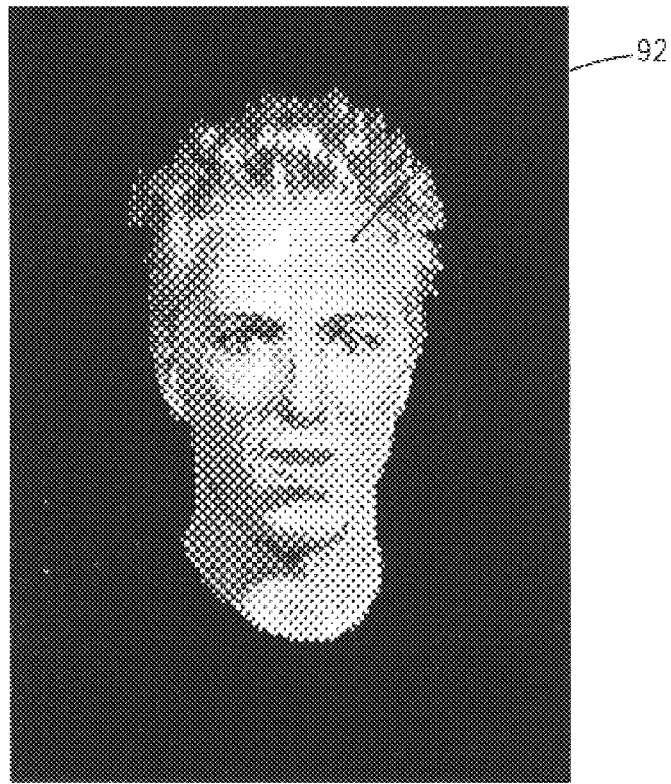
FIG. 10 shows a computer generated man face in accordance with the present invention.
Figure 11:
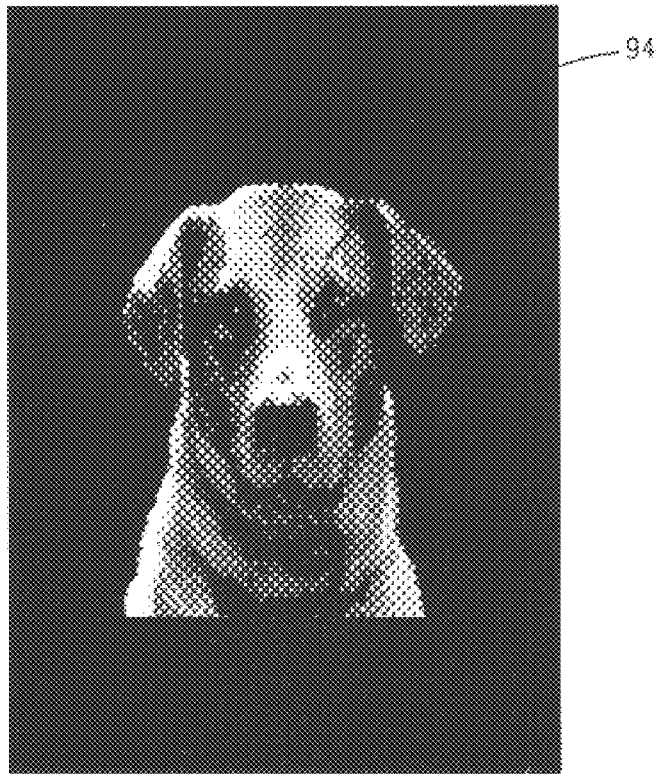
FIG. 11 shows a computer generated dog face in accordance with the present invention.
Figure 12:
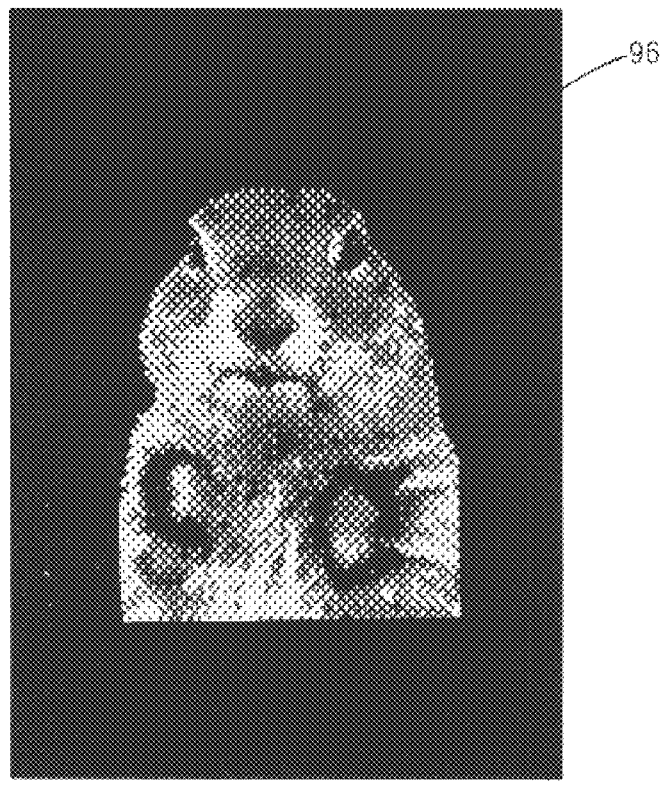
FIG. 12 shows a computer generated rodent face in accordance with the present invention.
Figure 13:
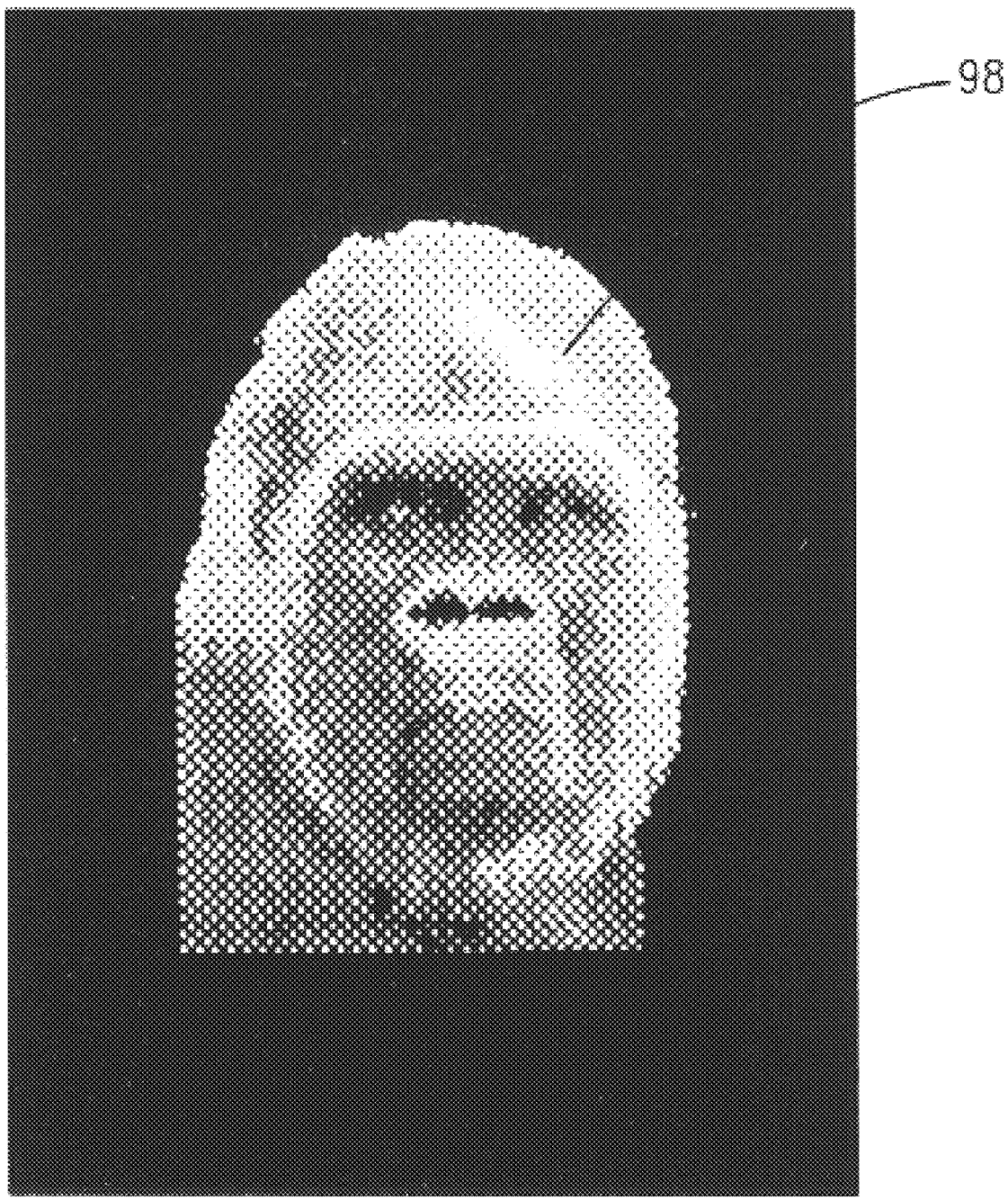
FIG. 13 shows a computer generated gorilla face in accordance with the present invention.

At this point it should be noted that, due to the typically flat surface of the touchscreen monitor 14, the eyes 84 and 86 of the computer generated synthetic face 50 and the entire computer generated synthetic face 50 must also be moved in a compensating manner. This is due to the optical illusion that occurs because of the typically flat surface of the touchscreen monitor 14. For example, referring to FIG. 8, there is shown a top view of the kiosk 10 with the video camera 16 removed for purposes of figure clarity. The touchscreen monitor 14 is located on one side of the cabinet 12 such that it is facing in the positive Z-axis direction. An object 88 (e.g., a human) is located at an angle of approximately 30 degrees from the center line indicating the direction in which the touchscreen monitor 14 is facing. In such a setting, to compensate for the optical illusion that occurs because of the typically flat surface of the touchscreen monitor 14, the eyes 84 and 86 of the computer generated synthetic face 50 and the entire computer generated synthetic face 50 would have to be directed at an angle of approximately 10 degrees from the center line indicating the direction in which the touchscreen monitor 14 is facing in order for the eyes 84 and 86 of the computer generated synthetic face 50 and the entire computer generated synthetic face 50 to appear to be directed at the object 88.

In most circumstances, the optical illusion that occurs because of the typically flat surface of the touchscreen monitor 14 can be compensated for by directing the eyes 84 and 86 of the computer generated synthetic face 50 and the entire computer generated synthetic face 50 at an angle that is approximately ⅓ of the actual angle formed between the center line indicating the direction in which the touchscreen monitor 14 is facing and a line formed from the center of the touchscreen monitor 14 to the location of the object or objects at which the eyes 84 and 86 of the computer generated synthetic face 50 and the entire computer generated synthetic face 50 are to be directed.

At this point it should be noted that although the computer generated synthetic face 50 has been shown herein as having human characteristics, it is within the scope of the present invention to provide a computer generated face having other than human characteristics. That is, a computer generated face having human, subhuman, real, imaginary, or any number of a variety of characteristics can be provided in accordance with the present invention. For example, referring to FIGS. 9, 10, 11, 12, and 13, there are shown a computer generated woman face 90, a computer generated man face 92, a computer generated dog face 94, a computer generated rodent face 96, and a computer generated gorilla face 98, respectively. Any of these computer generated faces may be used in the manner described above to provide a computer generated face having coordinated eye and head movement.

It should be noted that the mapping of such computer generated faces as shown in FIGS. 9–13 can be performed in accordance with the teachings of Kang et al. as described in U.S. patent application Ser. No. 08/815,981, entitled *Facial Image Method and Apparatus for Semi-Automatically Mapping a Face onto a Wireframe Topology,* filed Mar. 10, 1997, assigned to the assignee of the present application, and hereby incorporated herein by reference.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method for providing a computer generated face having coordinated eye and head movement, the method comprising the steps of:

providing a computer generated movable head;

providing at least one computer generated movable eye; and coordinating the movement of the computer generated movable head and the movement of the at least one computer generated movable eye such that the movement of the computer generated movable head follows the movement of the at least one computer generated movable eye.

2. The method as defined in claim 1, wherein the computer generated movable head is rotatable around any of three axes.

3. The method as defined in claim 1, wherein the computer generated movable head has an associated direction, further comprising the steps of:

determining a target angle in relation to the associated direction of the computer generated movable head; and rotating the computer generated movable head an angle that is approximately ⅓ of the target angle to compensate for an optical illusion.

4. The method as defined in claim 1, wherein the computer generated movable head is translatable along either of two axes.

5. The method as defined in claim 1, wherein the at least one computer generated movable eye is rotatable around any of three axes.

6. The method as defined in claim 1, wherein the at least one computer generated movable eye has an associated direction, further comprising the steps of:

determining a target angle in relation to the associated direction of the at least one computer generated movable eye; and rotating the at least one computer generated movable eye an angle that is approximately ⅓ of the target angle to compensate for an optical illusion.

7. The method as defined in claim 1, wherein the at least one computer generated movable eye is translatable along either of two axes.

8. The method as defined in claim 1, wherein the at least one computer generated movable eye includes a first movable eye having a first associated direction and a second movable eye having a second associated direction, wherein the method further comprises the step of:

moving the first movable eye and the second movable eye such that the first associated direction and the second associated direction are focused on a common target.

9. The method as defined in claim 1, further comprising the step of:

moving the computer generated movable head in a smooth and natural manner.

10. The method as defined in claim 1, further comprising the step of:

moving the at least one computer generated movable eye in a smooth and natural manner.

11. The method as defined in claim 1, further comprising the step of:

providing a facial expression on the computer generated movable head while coordinating the movement of the computer generated movable head and the at least one computer generated movable eye.

12. An apparatus for providing a computer generated face having coordinated eye and head movement, the apparatus comprising:

a first provider for providing a computer generated movable head;

a second provider for providing at least one computer generated movable eye; and a coordinator for coordinating the movement of the computer generated movable head and the movement of the at least one computer generated movable eye such that the movement of the computer generated movable head follows the movement of the at least one computer generated movable eye.

13. The apparatus as defined in claim 12, wherein the computer generated movable head is rotatable around any of three axes.

14. The apparatus as defined in claim 12, wherein the computer generated movable head has an associated direction, further comprising:

a determiner for determining a target angle in relation to the associated direction of the computer generated movable head; and a rotator for rotating the computer generated movable head an angle that is approximately ⅓ of the target angle to compensate for an optical illusion.

15. The apparatus as defined in claim 12, wherein the computer generated movable head is translatable along either of two axes.

16. The apparatus as defined in claim 12, wherein the at least one computer generated movable eye is rotatable around any of three axes.

17. The apparatus as defined in claim 12, wherein the at least one computer generated movable eye has an associated direction, further comprising:

a determiner for determining a target angle in relation to the associated direction of the at least one computer generated movable eye; and a rotator for rotating the at least one computer generated movable eye an angle that is approximately ⅓ of the target angle to compensate for an optical illusion.

18. The apparatus as defined in claim 12, wherein the at least one computer generated movable eye is translatable along either of two axes.

19. The apparatus as defined in claim 12, wherein the at least one computer generated movable eye includes a first movable eye having a first associated direction and a second movable eye having a second associated direction, wherein the apparatus further comprises:

a mover for moving the first movable eye and the second movable eye such that the first associated direction and the second associated direction are focused on a common target.

20. The apparatus as defined in claim 12, further comprising:

a mover for moving the computer generated movable head in a smooth and natural manner.

21. The apparatus as defined in claim 12, further comprising:

a mover for moving the at least one computer generated movable eye in a smooth and natural manner.

22. The apparatus as defined in claim 12, further comprising:

a third provider for providing a facial expression on the computer generated movable head while coordinating the movement of the computer generated movable head and the at least one computer generated movable eye.

23. An article of manufacture for providing a computer generated face having coordinated eye and head movement, the article of manufacture comprising:

a computer readable storage medium; and computer programming stored on the storage medium; wherein the stored computer programming is configured to be readable from the computer readable storage medium by a computer and thereby cause the computer to operate so as to:

provide a computer generated movable head;

provide at least one computer generated movable eye; and coordinate the movement of the computer generated movable head and the movement of the at least one computer generated movable eye such that the movement of the computer generated movable head follows the movement of the at least one computer generated movable eye.

24. The article of manufacture as defined in claim 23, wherein the computer generated movable head is rotatable around any of three axes.

25. The article of manufacture as defined in claim 23, wherein the computer generated movable head has an associated direction, further causing the computer to operate so as to:

determine a target angle in relation to the associated direction of the computer generated movable head; and rotate the computer generated movable head an angle that is approximately ⅓ of the target angle to compensate for an optical illusion.

26. The article of manufacture as defined in claim 23, wherein the computer generated movable head is translatable along either of two axes.

27. The article of manufacture as defined in claim 23, wherein the at least one computer generated movable eye is rotatable around any of three axes.

28. The article of manufacture as defined in claim 23, wherein the at least one computer generated movable eye has an associated direction, further causing the computer to operate so as to:

determine a target angle in relation to the associated direction of the at least one computer generated movable eye; and rotate the at least one computer generated movable eye an angle that is approximately ⅓ of the target angle to compensate for an optical illusion.

29. The article of manufacture as defined in claim 23, wherein the at least one computer generated movable eye is translatable along either of two axes.

30. The article of manufacture as defined in claim 23, wherein the at least one computer generated movable eye includes a first movable eye having a first associated direction and a second movable eye having a second associated direction, further causing the computer to operate so as to:

move the first movable eye and the second movable eye such that the first associated direction and the second associated direction are focused on a common target.

31. The article of manufacture as defined in claim 23, further causing the computer to operate so as to:

move the computer generated movable head in a smooth and natural manner.

32. The article of manufacture as defined in claim 23, further causing the computer to operate so as to:

move the at least one computer generated movable eye in a smooth and natural manner.

33. The article of manufacture as defined in claim 23, further causing the computer to operate so as to:

provide a facial expression on the computer generated movable head while coordinating the movement of the computer generated movable head and the at least one computer generated movable eye.

* * * * *